Dec. 15, 1942.  A. L. KRONQUEST ET AL  2,304,931
METHOD OF PREPARING BLACK PLATE BLANKS FOR FORMING CAN BODIES
Filed July 12, 1938
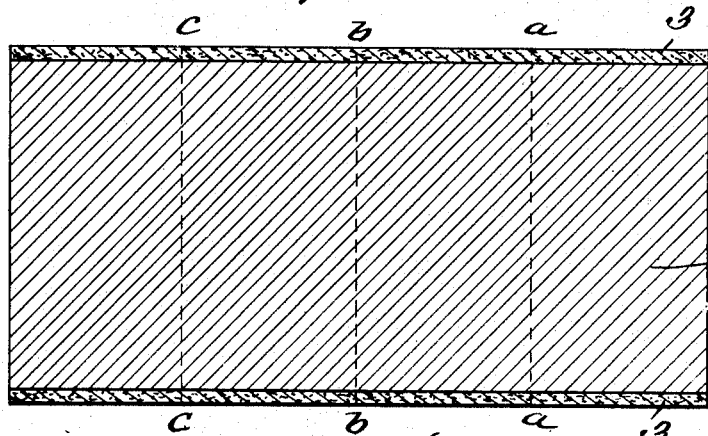
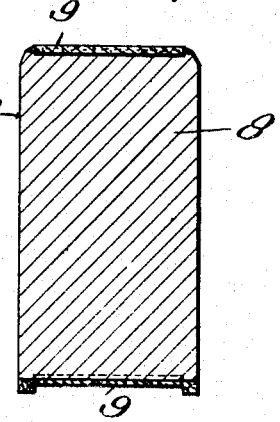
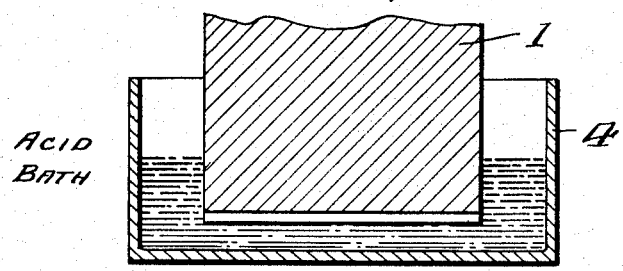
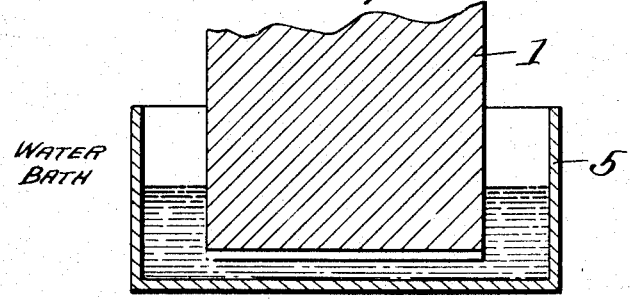
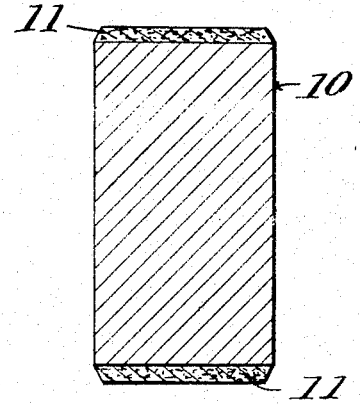
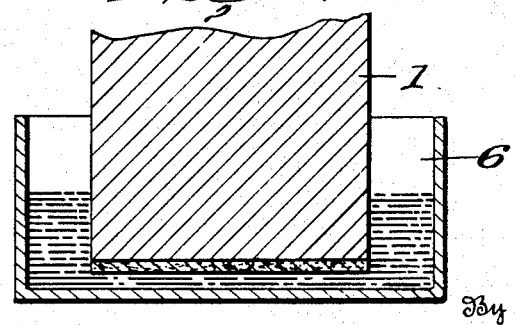
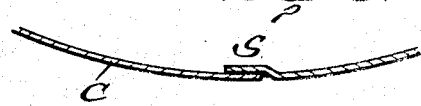
Inventor
Alfred L. Kronquest
Robert E. Follet
Mason Porter
By
Attorneys Patented Dec. 15, 1942

2,304,931

UNITED STATES PATENT OFFICE 2,304,931

METHOD OF PREPARING BLACK PLATE BLANKS FOR FORMING CAN BODIES

Alfred L. Kronquest and Robert E. Follet, Syracuse, N. Y., assignors to Continental Can Company, Inc., New York, N. Y., a corporation of New York Application July 12, 1938, Serial No. 218,893

1 Claim. (Cl. 117—37)

The invention relates to new and useful improvements in the method of making can bodies from black plate or mild steel. Difficulty has been experienced in the forming of a solder bonded side seam for a can body made from black plate, because the black plate when exposed to air, oxidizes, which forms a scale interfering with the solder adhering to the plate. One method which has been used in the making of a solder bonded side seam in a black plate can body consisted in removing the scale mechanically, and another in removing the scale by the use of an acid, so that in either instance, a clean surface is produced in the region where the solder bond must adhere to the black plate to form an hermetically sealed seam. However, if the plate is allowed to stand for some time after it is cleaned before the body is formed and the edges solder bonded, the surface will re-oxidize and an efficient solder bond cannot be obtained.

The herein described method seeking to remedy the problems and conditions referred to, consists of two principal steps; first, the cleaning of the edge portions of the plate of all surface scale where the solder is to be applied thereto, and second, subjecting the cleaned surface to a bath of copper sulphate or some other treating solution which co-acts with the iron to form a non-oxidizing covering therefor.

In the drawing there is illustrated diagrammatically one way of carrying out the method and the forming of can bodies from black plate.

Figure 1 is a plan view of a sheet which has been enameled and the edge portions of which have been plated by the improved method;

Fig. 2 is a view showing diagrammatically the step of subjecting the edge portions to an acid bath for cleaning the scale therefrom;

Fig. 3 is a view showing diagrammatically the subjecting of the acid treated edge portions to a water bath for removing the acid;

Fig. 4 is a view showing diagrammatically the subjecting of the cleaned edge portions to the copper sulphate bath for the plating of the edges;

Fig. 5 is a blank formed from black plate by our improved method ready for shaping the same into a cylindrical body and the joining of the side edges;

Fig. 6 shows a portion of the can body formed from the blank in Figure 5, with the edge portions interlocked in a side seam and solder bonded or welded;

Fig. 7 is a view of a body blank formed from black plate by the improved method where the edge portions are copper plated in the regions which are to be lapped in the forming of a side seam, and Fig. 8 is a view of a portion of a can body formed from the blank illustrated in Figure 7 with the edge portions lapped and solder bonded or welded.

In carrying out the method, the black plate may, if desired, be enameled in the flat, leaving the metal bare in the region where the hooks are to be formed and the edge portions solder bonded. The exposed metal portions are then cleaned by subjecting the same to a hot acid treatment. Hydrochloric acid may be used for this purpose very effectively. It may be heated so as to produce a gas, and the hydrochloric acid gas thus formed projected against the surface to be cleaned, or a bath consisting of hydrochloric acid or a dilute hydrochloric acid heated to a temperature of from one hundred to two hundred degrees F. may be used and the surface to be cleaned immersed in the bath. In place of the hydrochloric acid, sulphuric acid may be used for forming the bath.

After the surfaces of the plate which are to be solder bonded have been cleaned by the above treatment, then they are thoroughly washed to remove all trace of the acid, and before the cleaned surfaces are exposed to the air so that re-oxidation can take place, they are subjected to a bath of copper sulphate. This results in a copper deposit on the cleaned surfaces which will prevent re-oxidation. The light copper plating also assists in the solder bonding of the edge portions.

Referring to the drawing which shows diagrammatically the different steps followed in carrying out the method, the invention will be described more in detail. A black sheet indicated at 1 is selected and dimensioned as illustrated for the forming of four can bodies. The sheet is coated with enamel as indicated at 2, leaving edge portions 3, 3 of the metal exposed. The sheet is subsequently cut along the lines a—a, b—b, and c—c to form four blanks, each of which is of proper dimensions to form a can body. The edge portions 3 are notched and formed with hooks in the usual manner, then the blank is shaped to cylindrical form, the hooks bumped and the solder bond applied. The sheet before it is cut into blanks, or after it is cut into blanks, is subjected to a treatment for cleaning the oxide from the exposed edge portions of the blank. As shown in Figure 2, the sheet 1 is dipped in an acid bath indicated at 4. The acid bath is either hydrochloric acid or sulphuric acid. The edge portion remains in the bath a sufficient length of time for removing the scale from the black plate in the region where the sheet is bare. The acid bath does not affect the enamel coating placed on the black plate, even though the coating extends into the bath. After this acid bath treatment, then the edge portion is subjected to a water bath indicated at 5 in which all trace of the acid is washed from the plate. It is then subjected to a copper sulphate bath indicated at 6. The plate after it has been cleaned by subjecting it to the acid and the acid washed therefrom, is immersed in a copper bath before the cleaned surface has an opportunity to re-oxidize. The copper bath acts quickly to deposit a plating of copper on the cleaned surface. It is not thought necessary to define the chemical action which takes place, as it is well known that mild steel when immersed in copper sulphate will be plated with copper.

The steps which have been described are purely for the purpose of more clearly illustrating the invention, and it will be understood that in the commercial carrying out of the invention, other ways may be utilized for applying the acid bath or the acid fumes to the exposed metal portions of the plate which are to be cleaned, other ways may be utilized for washing the acid from the plate, and other ways may be utilized for subjecting the cleaned surface to the copper sulphate solution for plating the same. The essential features of the invention as applied to the making of can bodies consists in the cleaning of the edge portions of the blank which are formed into the side seam with acid so as to free said portions of scale; the washing of the edge portions to remove the acid, and the subjecting of the cleaned portions to the copper sulphate solution for the plating of the same. The copper plated surface will not oxidize, and the blanks after they have been thus treated need not be made immediately into can bodies and the solder applied, but if they are stored for several weeks, the cleaned surfaces will remain free of scale and an efficient solder bond can be formed for the side seam.

The method as described does not interfere with the lacquering or enameling of the plate, or even the decorating of the plate in the flat sheet, as the acid does not re-act with the ingredients used for enameling and only re-acts on the exposed metal part, and it will remove the scale from the exposed metal all the way up to the very edge of the enamel coating. When the blank is subjected to the copper sulphate solution, again the copper sulphate does not re-act on the enamel ingredients, while it does re-act on all parts of metal which are exposed and will, therefore, plate the metal with copper all the way up to the edge of the coating of enamel. Thus, there are no portions of the metal left to rust, as the metal will be completely covered with the enamel and the copper plating.

Referring again to the drawing, in Figure 5, a blank 7 is shown having a coating of enamel 8, and the edge portions are plated with copper as indicated at 9. These edge portions have been notched and formed with hooks, after which the blank is curved into the can body, a portion of which is indicated at C in Figure 6, and the hooks are interlocked and bumped to form a side seam s. After the side seam is thus formed, it is solder bonded or welded for providing an hermetic metallic bond joining the metal parts.

In Figure 7 of the drawing, the blank 10 is shown as coated with enamel leaving the edge portions 11, 11 exposed, and these edge portions are plated with the copper and then the blank is shaped into a can body as indicated in part at C in Figure 8, and the edge portions are lapped to form a side seam s, which lapped edge portions are copper plated, so that the surfaces may be joined by solder bonding or welding.

It is understood, of course, that when the sheet is to be formed into smaller blanks for smaller can bodies, the exposed metal portions which are to be formed into the side seam, may not necessarily be at the edges of the black plate, but said exposed portions will be at the side edges of the blank cut from the sheet so that when the hooks are formed, the cleaned plate surfaces will be disposed in the area of the hooks to facilitate the solder bonding.

While the use of solder for bonding the seam has been referred to in detail, it will be understood that the metal parts may be joined to form an hermetic seam by welding. It is just as essential that the metal portions which are to be joined by welding shall be cleaned of all scale and the copper plating of these surfaces will retain said surfaces free from scale until the welding operation is performed.

While the subjecting of the cleaned surfaces to a bath of copper sulphate is described in detail, it will be understood that other materials may be used for forming a coating for the cleaned surfaces, so long as it resists oxidation and does not interfere with the solder bonding of the surfaces when the seams are formed. While it is preferred to subject the exposed metal parts to an acid bath for cleaning the surfaces, it is understood that other ways may be provided for removing the scale, but it is essential that the cleaned surface shall be covered with a protective coating in order to prevent said surface from reoxidizing.

Having thus described the invention, what we claim as new and desire to secure by Letters Patent, is:

The method of preparing black plate blanks for forming can bodies having a solder-bonded side seam comprising coating a sheet of black plate shaped for forming one or more body blanks with enamel on both sides thereof, leaving exposed the edge portions of the sheet, which edge portions are to form the side seams in the can bodies, subjecting the edge portions of the enamel-coated sheet to an acid treatment for removing all scale therefrom so as to provide a clean iron surface, and subjecting said blanks before re-oxidation of the cleaned surfaces takes place to a bath of copper sulphate for forming a copper plating completely covering the exposed surfaces.

ALFRED L. KRONQUEST.
ROBERT E. FOLLET.